United States Patent
Walker

(10) Patent No.: US 7,936,876 B2
(45) Date of Patent: May 3, 2011

(54) SYSTEM AND METHOD FOR TRANSPORTING VIDEO DATA THROUGH A DUAL-LINK HD-SDI CONNECTION

(75) Inventor: Bradley William Walker, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1556 days.

(21) Appl. No.: 11/221,248

(22) Filed: Sep. 6, 2005

(65) Prior Publication Data

US 2006/0053441 A1 Mar. 9, 2006

Related U.S. Application Data

(60) Provisional application No. 60/608,527, filed on Sep. 9, 2004.

(51) Int. Cl.
*H04N 7/167* (2006.01)
(52) U.S. Cl. .......................... 380/210; 345/204
(58) Field of Classification Search .................. 345/204; 380/210
See application file for complete search history.

(56) References Cited

U.S. PATENT DOCUMENTS

2006/0210065 A1* 9/2006 Ito et al. ......................... 380/28

OTHER PUBLICATIONS

Review Specification entitled: "*Link Encryption for 1.5 Gb/s Serial Digital Interface*", SMPTE Standard for D-Cinema, © 2002- 2005, The Society of Motion Picture and Television Engineers, Mar. 15, 2005 (34 pages).
U.S. Appl. No. 11/221,247 entitled "*System and Method for Bit Stream Compatible Local Link Encryption*", filed Sep. 6, 2005, Applicants are Bradley W. Walker, Matthew J. Fritz and Reiner M. Doetskies.
U.S. Appl. No. 11/221,086 entitled "*System and Method for Transporting an Ancillary Data Packet in the Active Area of a Video Stream*", filed Sep. 6, 2005; Applicants are Bradley W. Walker and Matthew J. Fritz.
U.S. Appl. No. 11/220,246 entitled "*System and Method for Detecting AES Random Number Generator Synchronization Errors*", filed Sep. 6, 2005; Applicants are Reiner M. Doetzkies, Bradley W. Walker and Matthew J. Fritz.

* cited by examiner

*Primary Examiner* — Christopher J Brown
(74) *Attorney, Agent, or Firm* — Charles A. Brill; Wade James Brady, III; Frederick J. Telecky, Jr.

(57) ABSTRACT

In accordance with the teachings the present invention, a system and method for transporting video data through a dual-link HD-SDI connection is provided. In a particular embodiment of the present invention, the method includes coupling a digital video projector and a playback server with a dual-link HD-SDI connection, the dual-link HD-SDI connection having four 10-bit subchannels; dividing 12-bit, 4:4:4, RGB video data into four 9-bit sections; mapping each 9-bit section of video data into nine least significant bits of a respective one of the four 10-bit subchannels; setting a most significant bit of each 10-bit subchannel to be a compliment of a next most significant bit of the 10-bit subchannel; and transporting the sections of video data from the playback server to the digital video projector through the dual-link HD-SDI connection.

20 Claims, 3 Drawing Sheets

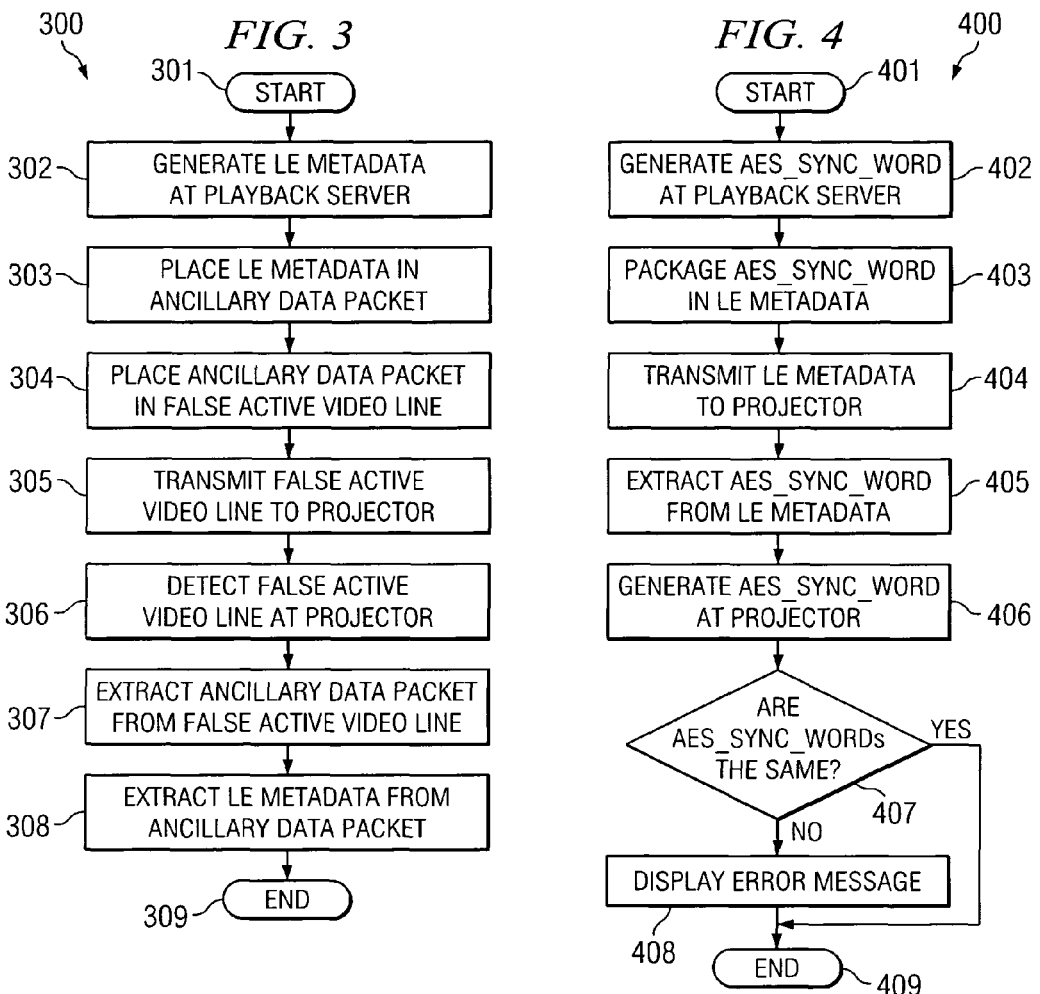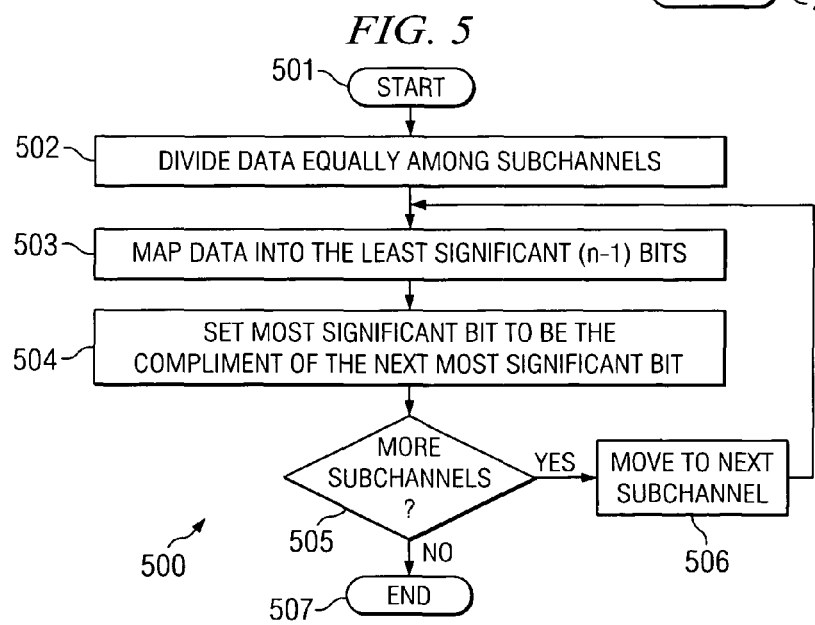

SYSTEM AND METHOD FOR TRANSPORTING VIDEO DATA THROUGH A DUAL-LINK HD-SDI CONNECTION

RELATED APPLICATION

The present application claims the benefit of U.S. Provisional Patent Application No. 60/608,527, filed on Sep. 9, 2004, which is hereby incorporated by reference.

TECHNICAL FIELD

The present invention relates generally to digital cinema projection systems, and more particularly to a system and method for transporting video data through a dual-link HD-SDI connection.

BACKGROUND

Digital cinema projection systems are often used to display motion pictures in commercial movie theaters. Typically, such systems comprise a digital video projector and a playback server that provides digital content to the projector. In typical projection systems, the content is supplied from the server to the projector over one or more video links, such an a high definition serial digital interface ("HD-SDI") or digital video interface ("DVI") connection. In order to accommodate higher resolution content, such as 12-bit, 4:4:4 RGB video data, some digital cinema projection systems employ two video links, or a "dual-link," to provide the bandwidth necessary to transfer this higher resolution content from the playback server to the projector.

A variety of encoding schemes may be employed to transfer content over dual-link systems. For example, the conventional method of transmitting 12-bit, 4:4:4, RGB data over a dual-link HD-SDI connection is the Society of Motion Picture and Television Engineers ("SMPTE") 372 standard. Unfortunately, SMPTE 372 reserves certain codes for non-video, synchronization data. This, however, limits the range of video codes that may be transported over the dual-link connection, which in turn limits the resolution of video content that may be transported over the dual-link HD-SDI connection.

SUMMARY OF THE INVENTION

In accordance with the teachings the present invention, a system and method for transporting video data through a dual-link HD-SDI connection is provided. In a particular embodiment of the present invention, the method comprises coupling a digital video projector and a playback server with a dual-link HD-SDI connection, the dual-link HD-SDI connection having four 10-bit subchannels; dividing 12-bit, 4:4:4, RGB video data into four 9-bit sections; mapping each 9-bit section of video data into nine least significant bits of a respective one of the four 10-bit subchannels; setting a most significant bit of each 10-bit subchannel to be a compliment of a next most significant bit of the 10-bit subchannel; and transporting the sections of video data from the playback server to the digital video projector through the dual-link HD-SDI connection.

A technical advantage of some embodiments of the present invention includes the ability to encode 12-bit, 4:4:4, RGB data for transport through a dual-link HD-SDI without generating any prohibited codes. This allows more of the bandwidth of the dual-link HD-SDI connection to be utilized, allowing content providers to provide higher resolution content.

Another technical advantage of some embodiments of the present invention includes the ability to implement an AES-based local link encryption scheme that maintains bit stream compatibility. Since particular embodiments of the present invention prevent the generation of prohibited codes, these embodiments may be used transport encrypted data across different link types without the need to decrypt and re-encrypt the data for each different link type.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and features and advantages thereof, reference is now made to the following description, taken in conjunction with the accompanying drawings, in which:

FIG. 3 illustrates a flowchart of a method of transmitting an ancillary data packet in the active area of a video stream in accordance with a particular embodiment of the present invention;

FIG. 4 illustrates a flowchart of a method of detecting synchronization errors within an AES-based local link encryption system in accordance with a particular embodiment of the present invention; and FIG. 5 illustrates a flowchart of a method of transporting video data through a dual-link HD-SDI in accordance with a particular embodiment of the present invention.

DESCRIPTION OF EXAMPLE EMBODIMENTS

Figure 1:
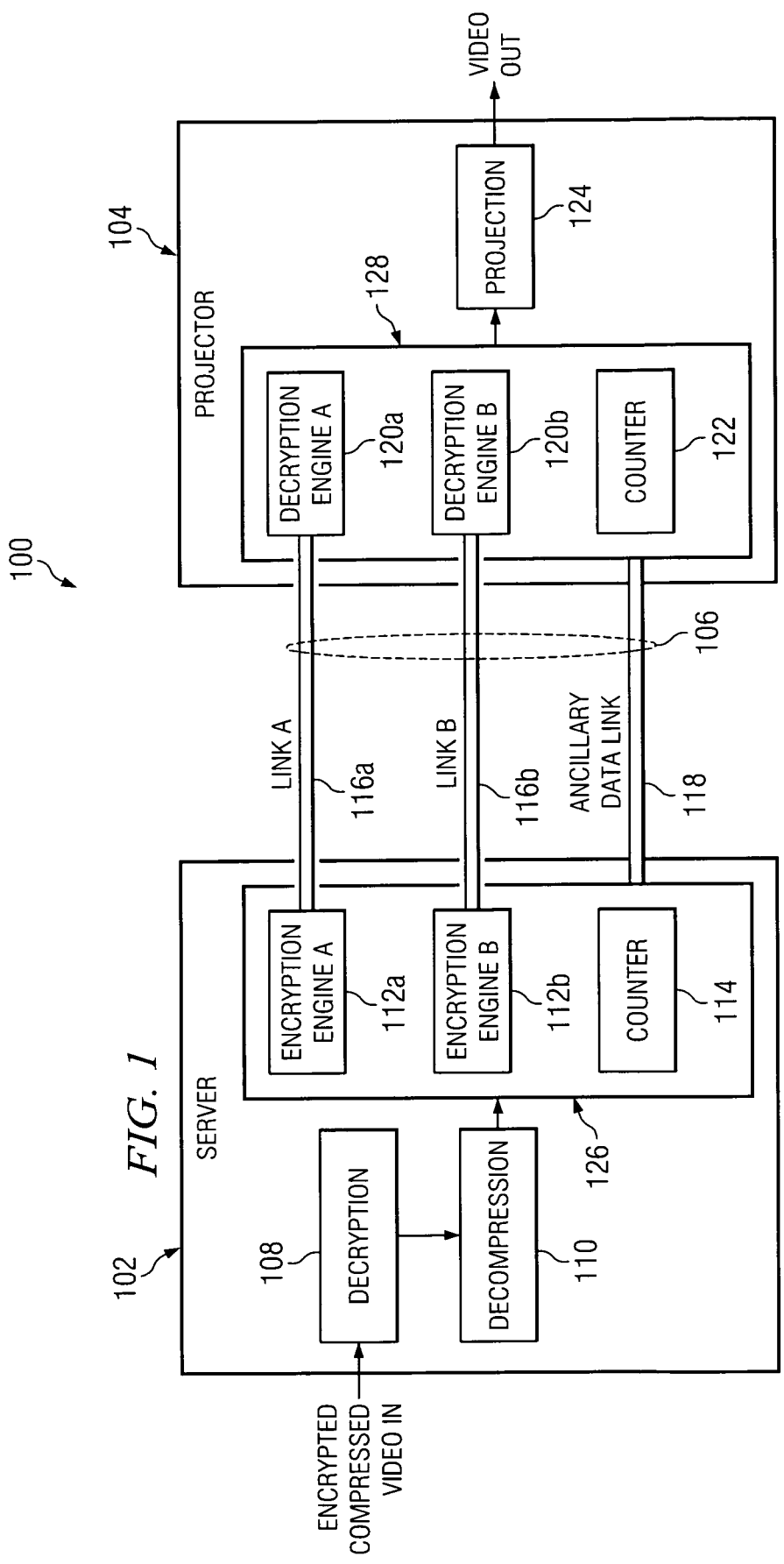
FIG. 1 illustrates a digital cinema projection system in accordance with a particular embodiment of the present invention.

FIG. 1 illustrates a digital cinema projection system 100 in accordance with a particular embodiment of the present invention. As shown in FIG. 1, digital cinema projection system 100 comprises playback server 102 and digital video projector 104, coupled by local link 106. Generally, playback server 102 receives encrypted, compressed video data for projection by projector 104. Playback server 102 then decrypts and decompresses the video data, resulting in an unencrypted, uncompressed video signal. This signal is then locally re-encrypted (typically with a lower level of encryption) and sent over local link 106 to digital cinema projector 104, which then decrypts and displays the video signal. By re-encrypting the video for transfer over local link 106, particular embodiments of the present invention help to minimize or prevent unauthorized access of the video.

As shown in FIG. 1, playback server 102 comprises decryption module 108, decompression module 110, and local link encryption module 126. As mentioned above, playback server 102 receives encrypted, compressed video data and prepares the video data to be displayed by projector 104. In particular embodiments, this video data may be supplied remotely, such as via satellite, or locally by a digital media storage device. Once supplied to server 102, the encrypted, compressed video data is decrypted by decryption module 108 and then decompressed by decompression module 110. The decrypted, decompressed video data is then re-encrypted by local link encryption module 126 for transfer to projector 104 via local link 106.

In particular embodiments of the present invention, locally-encrypting the video comprises encrypting the video data using one or more (depending on the number of physical links for carrying video between server 102 and projector 104) Advanced Encryption System ("AES") based encryption engines 112 in encryption module 126. Each encryption engine 112 utilizes an AES counter 114 and an AES key (not explicitly shown) to encrypt the video data. In the embodiment illustrated in FIG. 1, encryption module 126 comprises two encryption engines 112a and 112b, one dedicated to each video link 116 in local link 106. In particular embodiments, these multiple encryption engines 112 may share the same AES counter and/or AES key. However, as would be understood by one skilled in the art, more secure encryption may be provided by using separate AES keys for each encryption engine 112.

Once re-encrypted, the video data may then be transferred to projector 104 via local link 106. Local link 106 generally comprises at least one video link 116 and at least one ancillary data link 118 for transferring data between playback server 102 and projector 104. In the embodiment shown in FIG. 1, local link 106 comprises two video links 116a and 116b. Generally, systems comprising only one video link 116 may be referred to as "single-link" systems, whereas systems comprising two video links 116 may be referred to as "dual-link" systems. Systems comprising two or more video links 116 may be referred to as "multi-link" systems. Thus, as illustrated in FIG. 1, local link 106 may be referred to as a dual-link, or multi-link, system.

In typical embodiments, video links 116 are used to transport encrypted, video data between server 102 and projector 104, while ancillary data link 118 is used to transport unencrypted, non-video data, such as AES keys and other encryption/decryption synchronization information. In particular embodiments, video links 116 are typically HD-SDI or DVI connections, or a combination thereof, while ancillary data link 118 is typically an Ethernet connection.

As used herein, the terms "link" and "channel" are used interchangeably to refer to a single, physical data link between server 102 and projector 104. Each channel or link may comprise a plurality of logical subchannels. In the case of a HD-SDI link, each channel comprises two parallel, 10-bit subchannels, which are often referred to as the "Y" and "C" subchannels. This is due to the fact that the "Y" subchannel traditionally carries luminance data, while the "C" subchannel traditionally carries chrominance data. However, the "Y" and "C" subchannels of an HD-SDI link need not carry luminance and chrominance data, respectively, and can carry other information as well. Similarly, a DVI link may comprises three different subchannels, which are often referred to as the "R," "G," and "B" subchannels due to the fact that the subchannels traditionally carry the red, green, and blue components of a video signal, respectively. However, other information may be carried by the various subchannels.

Once transported across local link 106, the locally-encrypted video data arrives as digital cinema projector 104. As shown in FIG. 1, digital cinema projector 104 generally comprises a local link decryption module 128 and a projection module 124. Locally-encrypted video data enters projector 104 via local link 106 and is decrypted by local link decryption module 128. Similar to local link encryption module 126, local link decryption module 128 comprises one or more (depending on the number of physical links for carrying video between server 102 and projector 104) AES-based decryption engines 120. Each decryption engine 120 utilizes an AES counter 122 and the AES key from the corresponding encryption engine 112 to decrypt the video data. In the embodiment illustrated in FIG. 1, decryption module 128 comprises two decryption engines 120a and 120b, one dedicated to each video link 116 in local link 106. In particular embodiments, these multiple decryption engines 120 may share the same AES counter and/or AES key. However, as mentioned above in regard to encryption engines 112, more secure encryption may be provided by using separate AES keys. Once decrypted, the video data may be projected by projection module 124, which may utilize any suitable digital projection technology, such as a DLP™, LCD, or LCoS projection system.

Figure 2:
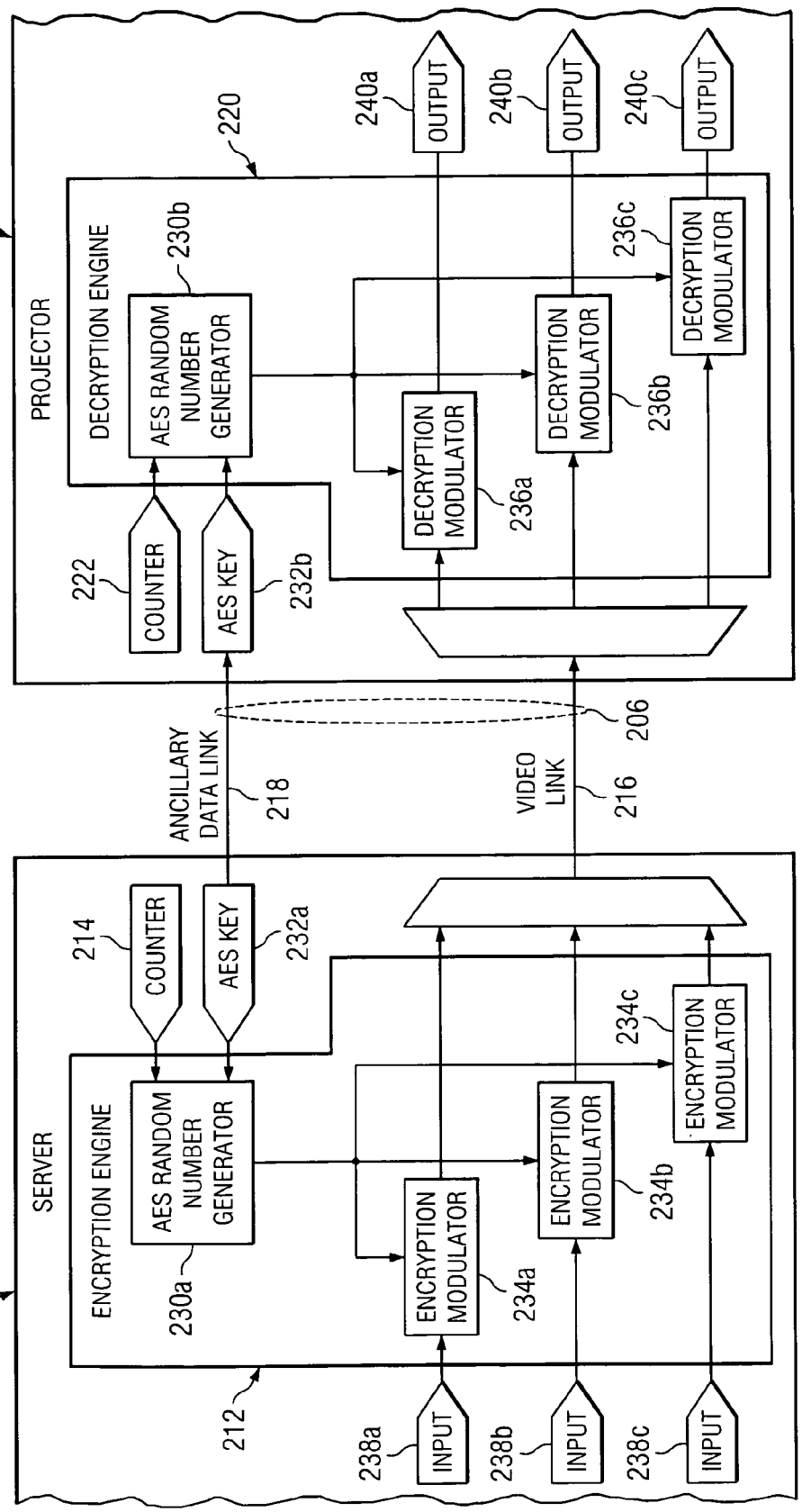
FIG. 2 illustrates a set of encryption and decryption engines in a digital cinema projection system in accordance with a particular embodiment of the present invention.

A better understanding of the encryption and decryption engines of the present invention may be had by making reference to FIG. 2, which illustrates local link encryption system 200. Local link encryption system 200 is one example of encryption and decryption engines that may be used in accordance with a digital cinema projection system, such as digital cinema projection system 100 in FIG. 1. As shown in FIG. 2, local link encryption system 200 comprises a encryption engine 212 in playback server 202 and a decryption engine 220 in digital cinema projector 204 coupled by local link 206, which comprises video link 216 and ancillary data link 218.

The structures of encryption engine 212 and decryption engine 220 are generally similar, with a primary difference being encryption modulators 234 in encryption engine 212 and decryption modulators 236 in decryption engine 220. Generally, encryption engine 212 comprises three encryption modulators 234a-c and an AES random number generator 230a, which generates two or three 10-bit streams (depending on the mapping mode) of random numbers at the input pixel rate. In particular embodiments, these random numbers may be generated by AES random number generator 230a operating in counter mode, using AES key 232a and AES counter 214 as inputs. Encryption modulators 234a-c then encrypt the inputs 238a-c using the respective AES random number streams, as is known in the art.

Similarly, decryption engine 220 comprises three decryption modulators 236a-c and AES random number generator 230b, which also generates two or three 10-bit streams (depending on the mapping mode) of random numbers at the input pixel rate. In particular embodiments, these random numbers are generated by AES random number generator 230b operating in counter mode, using AES key 232b (which is received over ancillary data link 218 and is identical AES key 232a) and AES counter 222 as inputs. The decryption modulators 236a-c then decrypt the locally-encrypted video data using their respective AES random number streams, as is known in the art.

In particular implementations of a digital cinema projection system utilizing an HD-SDI video link 216 between playback server 202 and digital cinema projector 204, there are eight "invalid" codes (0, 1, 2, 3, 1020, 1021, 1022, and 1023) that are reserved for synchronization that may not be transmitted down video link 216. Therefore, encryption engine 212 allows for these invalid codes to be detected and discarded in the AES random number stream prior to modulating the incoming pixel data. This, however, requires AES random number generator 230 to operate slightly faster than the incoming pixel data. For embodiments utilizing other connection types, such as DVI, this invalid code detection and discarding may not be required and may be disabled.

As mentioned above, encryption modulators 234 and decryption modulators 236 encrypt and decrypt the video data using their respective AES random number streams. These modulators 234 and 236 are defined such that given plaintext in the range of 4 to 1019 and an AES random number stream in the range of 0 to 1015, the encryption modulator 234 will generate encrypted ciphertext (from the input plaintext) in the range of 4 to 1019. Thus, only valid codes will be transmitted down video link 216. Once at the decryption modulator 236, this encrypted ciphertext is decrypted with a AES random number stream synchronized with that used by the encryption modulator 234.

In particular embodiments, the encryption and decryption modulators may be defined by the following equations:

Encryption: $Ci=[(Mi-N1)+Ei] \mod(N2)+N1$

Decryption: $Mi=[(Ci-N1)-Ei] \mod(N2)+N1$ where:
Mi=input (output) data of the encryption (decryption) modulator
Ci=encrypted data
Ei=pseudo-random number from the AES random number generator
N1=number of invalid codes in the lower area
N2=number of allowed codes in the video data For modes that discard invalid codes, N1=4 and N2=1016. For modes that do not discard invalid codes, N1=0 and N2=1024.

As mentioned above, each AES random number generator 230 uses an AES key 232 to generate random numbers. When used in a local link encryption system, AES key 232 may also be referred to as a link encryption ("LE") key. In particular embodiments, this LE key is a 128-bit pseudo-random number. So that the encrypted data is decrypted properly, the same LE key must be used by encryption engine 212 and the corresponding decryption engine 220. Therefore, local link encryption system 200 also includes ancillary data link 218, which allows the LE keys to be exchanged between AES random number generators 230a and 230b. In addition to exchanging LE keys, encryption engine 212 and decryption engine 220 may also exchange a variety of other information regarding the LE keys. In particular embodiments, this information may include the message type (LE_KEY_MESSAGE_TYPE), message length (LE_KEY_MESSAGE_LENGTH), expiration time of the LE key (EXPIRE_TIME), LE attribute data (LE-ATTRIBUTE_DATA), and LE key ID (LE_KEY_ID). This information, as well as the LE key itself, may be sent from playback server 202 to digital cinema projector 204 via ancillary data link 218 in a LE key message that is typically encrypted using the same encryption technique used in order to log on to projector 204. The details of one example of such an LE key message are described below in Table 1

TABLE 1

LE Key Message Data

| Field | Description | Size |
| --- | --- | --- |
| LE_KEY_MESSAGE_TYPE | Always set to zero | 2 bytes |
| LE_KEY_MESSAGE_LENGTH | Length of the LE Key Message | 2 bytes |
| EXPIRE_TIME | Time for LE Key to live in seconds | 4 bytes |
| LE_ATTRIBUTE_DATA | LE attribute data for use in the AES counter | 8 bytes |
| LE_KEY_ID | ID of the LE_KEY and LE_ATTRIBUTE_DATA carried in the message | 2 bytes |
| LE_KEY | Contains the LE Key | 16 bytes |

In particular embodiments of the present invention, the LE keys and LE attribute data for a video stream may be sent to projector 204 before the start of the video stream. In other embodiments, each individual LE key and LE attribute data may be sent to projector 204 before each corresponding segment of the video stream. At projector 204, each LE key and LE attribute data are typically stored in volatile memory (not explicitly shown). Each LE key stays in memory until the time from receipt of the LE key message is greater than the expiration time (EXPIRE_TIME), until the LE key is replaced by a new LE key, or until the LE key is manually deleted.

Data used to indicate LE key changes and other unencrypted, time critical data may also be sent from playback server 202 to projector 204 in a LE metadata message via ancillary data link 218 or an ancillary data packet over video link 216. Generally, such time critical data includes the LE key ID for the current video segment (CURRENT_LE_KEY_ID), as well as the LE key ID for the next video segment (NEXT_LE_KEY_ID). Other information included in the metadata may include the number of frames from the previous LE key change (CURRENT_FRAME_COUNT), the version number (VERSION), the number of video data links (LINK_NUMBER), and an AES synchronization word (AES_SYNC_WORD) used to verify the synchronization of the AES random number generators 230 in the server 202 and projector 204. Table 2 provides more information regarding one example of such a LE metadata message.

TABLE 2

| Item | Description | Size |
|---|---|---|
| LE Key Metadata | | |
| NEXT_LE_KEY_ID | LE_KEY_ID of the next key | 12 bits |
| CURRENT_LE_KEY_ID | LE_KEY_ID of the current key | 12 bits |
| CURRENT_FRAME_COUNT | Number of frames from the previous key change, reset to zero at key change | 24 bits |
| VERSION | Always set to zero | 6 bits |
| LINK_NUMBER | 0 = single link or link A of dual link; 1 = link B of dual link; 2, 3 = reserved | 2 bits |
| AES_SYNC_WORD | Valid 10-bit AES word directly following the AES word used to encrypt the last active pixel of the last active line of the previous frame. Used by projector to verify synchronization of the AES random number generators. | 10 bits |

In particular embodiments of the present invention, the LE metadata may take different forms, generally depending on the video link 206 employed. For example, in a SMPTE 292 (HD-SDI) link implementation, LE metadata is typically based on the SMPTE 291M standard and mapped into the user data area of an ancillary data packet using the Type 2 data identification. In single-link HD-SDI embodiments, this LE metadata ancillary data packet may be mapped into the vertical ancillary data area of the "Y" subchannel; in dual-link HD-SDI connections, it may be mapped into the vertical ancillary data area of the "G" and "A" subchannels. In both single-link and dual-link embodiments, this mapping is typically done at least one full horizontal line prior to the first active video line. The packet structure for one such SMPTE 292 implementation is described below in Table 3.

TABLE 3

| Name | Value |
|---|---|
| SMPTE 292 Ancillary Data Packet Structure for LE Metadata | |
| Ancillary Data Flag | 000H, 3FFH, 3FFH |
| Data Identification | 50H |
| Secondary Data Identification | 51H |
| Data Count | 0AH |
| User Data | LE METADATA |
| Checksum | — |

For a DVI link, which unlike SMPTE 292 does not have an ancillary data area, LE metadata may be located in the active video area in an ancillary data packet, as described below in TABLE 4.

TABLE 4

| Name | Value |
|---|---|
| DVI Ancillary Data Packet Structure for LE Metadata | |
| Ancillary Data Flag | 000H, 3FFH, 3FFH, 000H, 3FFH, 3FFH, 000H, 3FFH, 3FFH, 000H, 3FFH, 3FFH, 000H, 3FFH, 3FFH |
| Data Identification | 50H |
| Secondary Data Identification | 51H |
| Data Count | 0AH |
| User Data | LE METADATA |
| Checksum | Calculated the same way as for SMPTE 292 |

Since the DVI interface lacks an ancillary data area, the ancillary data packet is typically placed within a false active video line within each frame of video. In particular embodiments this false active video line is the first line of active video, in effect moving the true active video down one line. In particular embodiments, this is done by mapping the LE metadata ancillary data packet into the red and green subchannels of the DVI bus. TABLE 5 describes an example of one such mapping.

TABLE 5

| | Metadata | | | | | | | | | |
|---|---|---|---|---|---|---|---|---|---|---|
| | | Bit 9 | Bit 8 | Bit 7 | Bit 6 | Bit 5 | Bit 4 | Bit 3 | Bit 2 | Bit 1 | Bit 0 |
| DVI Bus | | RED1 | RED0 | GRN7 | GRN6 | GRN5 | GRN4 | GRN3 | GRN2 | GRN1 | GRN0 |

DVI Ancillary Data Packet Bit Mapping

When projector 202 detects the presence of the ancillary data packet on the first active line of video of a frame, the projector captures the ancillary data packet and discards the rest of the line. The other lines of the frame (i.e., the true active video), however, are displayed properly.

For both DVI and HD-SDI embodiments, the LE metadata may be mapped into the ancillary data packet user data area as described below in Table 6, for example.

TABLE 6

Ancillary Data Packet User Data Area Definition

| | Bits | | | | | | | | | |
|---|---|---|---|---|---|---|---|---|---|---|
| | Bit 9 | Bit 8 | Bit 7 | Bit 6 | Bit 5 | Bit 4 | Bit 3 | Bit 2 | Bit 1 | Bit 0 |
| Word 1 | Compliment of Bit 8 | Even Parity of Bit 0-Bit 7 | | | NEXT_LE_KEY_ID (7:0) | | | | | |
| Word 2 | | | RSV | RSV | RSV | RSV | NEXT_LE_KEY_ID (11:8) | | | |
| Word 3 | | | | | CURRENT_LE_KEY_ID (7:0) | | | | | |
| Word 4 | | | RSV | RSV | RSV | RSV | CURRENT_LE_KEY_ID (11:8) | | | |
| Word 5 | | | | | CURRENT_FRAME_COUNT (7:0) | | | | | |
| Word 6 | | | | | CURRENT_FRAME_COUNT (15:8) | | | | | |
| Word 7 | | | | | CURRENT_FRAME_COUNT (23:16) | | | | | |
| Word 8 | | | | | VERSION (5:0) | | | | LINK_# (1:0) | |
| Word 9 | | | | | AES_SYNC_WORD (7:0) | | | | | |
| Word 10 | | | RSV | RSV | RSV | RSV | RSV | AES_SYNC_WORD (9:8) | | |

FIG. 3 illustrates a particular embodiment of a method of transmitting such an ancillary data packet in the active area of a video stream. As shown in FIG. 3, flowchart 300 illustrates a method of transmitting an ancillary data packet in the active area of a video stream in accordance with a particular embodiment of the present invention. After flowchart 300 begins in block 301, LE metadata is generated at a playback server in block 302. The LE metadata is then placed in an ancillary data packet, in block 303, and the ancillary data packet is placed in active area of a video stream as a false line of video in block 304. The video stream containing the false line is then transmitted to a digital cinema projector in block 305. The projector then detects the false active video line in block 306 and extracts the ancillary data packet in block 307, while properly displaying the remainder of the active video. The LE metadata is then extracted from the ancillary data packet in block 308, and the flowchart terminates in block 309.

By placing ancillary data packets in the active area of a video stream, particular embodiments of the present invention enable the transmission of ancillary data over DVI links despite the absence of a built-in ancillary data area in the DVI interface. This helps ensure the proper operation of the local link encryption system by allowing time-critical, control data to be sent over the video link along with the active video stream.

Particular embodiments of the present invention also allow AES random number generator synchronization errors to be detected. As mentioned above in regard to Table 2, particular embodiments of the present invention include an AES synchronization word in the LE metadata that is transmitted from the playback server to the digital cinema projector. Generally, this AES synchronization word is an extra 10-bit AES word that directly follows the AES word used to encrypt the last active pixel of the last active line of the previous frame of video. This AES synchronization word is extracted from the LE metadata by the projector and is compared to an AES synchronization word generated within the projector. Any discrepancy between the two synchronization words indicates a possible synchronization error between the AES random number generators in corresponding encryption and decryption engines. Since this technique compares actual random numbers from the AES random number generators, in addition to synchronization errors, it may also detect other types of AES random number problems, such as incorrect link encryption keys. In response to such a synchronization error or other AES random number problem, particular embodiments of the present invention may include functionality in the projector to indicate an error has occurred. In particular embodiments this may include projecting a message indicating an error has occurred or simply showing a blank screen. FIG. 4 illustrates a particular embodiment of such an AES synchronization check.

As shown in FIG. 4, flowchart 400 illustrates an AES synchronization check in accordance with a particular embodiment of the present invention. After flowchart 400 begins at block 401, an AES_SYNC_WORD is generated at the playback server in block 402. This AES_SYNC_WORD is then packaged in an LE metadata message in block 403, and transmitted to the digital cinema projector in block 404. At block 405, the digital cinema projector then extracts the AES_SYNC_WORD generated by the playback server. The projector also generates its own AES_SYNC_WORD at block 406. The two AES_SYNC_WORDs (one generated by the server, one generated by the projector) are then compared in block 407. If the AES_SYNC_WORDs are identical, then the flowchart simply terminates at block 409. If, however, the AES_SYNC_WORDs differ, indicating a potential synchronization error, an error message is displayed at block 408 before the flowchart terminates at block 409.

Particular embodiments of the present invention may also utilize an AES counter that is independent the video link type (e.g., HD-SDI or DVI). For example, certain known AES encryption techniques utilize an AES counter that is driven by the HD-SDI line number, per the SMPTE 292 standard. This, however, may prevent the use of non-HD-SDI links in conjunction with the system. Therefore, particular embodiments of the present invention utilize an AES counter that instead uses the active video line number to drive the AES counter. In such an embodiment, the AES counter definition may include the link number (LINK_NUMBER), LE attribute data (LE_ATTRIBUTE_DATA), frame count (FRAME_COUNT), active line count (LINE_COUNT), and cipher block count (CIPHER_BLOCK_COUNT) (as would be known by one skilled in the art, a cipher block is generated from the AES key and AES counter and converted into random number streams by the AES random number generator). Table 7 provides a more extensive description of each of these AES inputs.

TABLE 7

AES Counter Definition

| AES Input Bit | AES Input Name | Description |
|---|---|---|
| [127:126] | LINK_NUMBER | 0 = single-link or link A of dual-link; 1 = link B of dual-link; 2-3 = reserved |
| [125:120] | RESERVED | 0 = Default |
| [119:56] | LE_ATTRIBUTE_DATA | Attribute data extracted from LE key |
| [55:32] | FRAME_COUNT | Number of frames from the previous key change; reset to zero at key change |
| [31:16] | LINE_COUNT | Active video line number; reset to zero for the first line of every frame |
| [15:0] | CIPHER_BLOCK_COUNT | Number of cipher blocks; reset to zero for the first block of every line |

Particular embodiments of the present invention may also use a variety of video encoding schemes to encode video for transport over the local link. For example, the SMPTE 292 standard may be used to encode 10-bit, 4:2:2, RGB video data over an HD-SDI single-link. Similarly, the SMPTE 372 standard may be used to encode 12-bit, 4:4:4, RGB video data over a HD-SDI dual-link.

Generally, transmitting 12-bit, 4:4:4, RGB video data requires 36 bits per pixel (12 bits/component×3 components). In the SMPTE 372 standard, the 36 bits are mapped into the four, 10-bit subchannels of the HD-SDI dual-link (2 links×2 subchannel/link) such that three subchannels each carry 10 bits, while the fourth subchannel carries only 6 bits (4 bits remain unused). This direct mapping, however, is limited by the eight "invalid" codes for HD-SDI mentioned previously. This, in turn, limits the range of video codes that may be transported across the dual-link, which can be problematic in high-performance digital cinema systems.

Particular embodiments of the present invention overcome this limitation by mapping the video data into the subchannels of the HD-SDI link using an encoding scheme that allows the transmission of 12-bit, 4:4:4, RGB video data without the generation of invalid codes. In such an encoding scheme, the 36 bits are mapped into the four 10-bit subchannels equally, with 9 bits on each of the four subchannels. The tenth bit of every subchannel is then set to be the compliment of the ninth bit. In particular embodiments, this tenth bit is the most significant bit, while the ninth bit is the next most significant bit. This prevents the encoder from generating an invalid/protected code. Table 8 describes an example of one such encoding scheme, relative to the SMPTE 372 standard, for five pixels.

TABLE 8

| | Link A | | | Link B | |
|---|---|---|---|---|---|
| Pixel # | SMPTE 372 Encoding | New Encoding | Pixel # | SMPTE 372 Encoding | New Encoding |
| 0 | B_2 | B_3 | 1 | B_2 | B_3 |
| 0 | B_3 | B_4 | 1 | B_3 | B_4 |
| 0 | B_4 | B_5 | 1 | B_4 | B_5 |
| 0 | B_5 | B_6 | 1 | B_5 | B_6 |
| 0 | B_6 | B_7 | 1 | B_6 | B_7 |
| 0 | B_7 | B_8 | 1 | B_7 | B_8 |
| 0 | B_8 | B_9 | 1 | B_8 | B_9 |
| 0 | B_9 | B_10 | 1 | B_9 | B_10 |
| 0 | B_10 | B_11 | 1 | B_10 | B_11 |
| 0 | B_11 | NOT USED | 1 | B_11 | NOT USED |
| 0 | G_2 | G_3 | 0 | R_0 | R_0 |
| 0 | G_3 | G_4 | 0 | R_1 | R_1 |
| 0 | G_4 | G_5 | 0 | G_0 | R_2 |
| 0 | G_5 | G_6 | 0 | G_1 | G_0 |
| 0 | G_6 | G_7 | 0 | B_0 | G_1 |
| 0 | G_7 | G_8 | 0 | B_1 | G_2 |
| 0 | G_8 | G_9 | 0 | NOT USED | B_0 |
| 0 | G_9 | G_10 | 0 | NOT USED | B_1 |
| 0 | G_10 | G_11 | 0 | NOT USED | B_2 |
| 0 | G_11 | NOT USED | 0 | NOT USED | NOT USED |
| 0 | R_2 | R_3 | 1 | R_2 | R_3 |
| 0 | R_3 | R_4 | 1 | R_3 | R_4 |
| 0 | R_4 | R_5 | 1 | R_4 | R_5 |
| 0 | R_5 | R_6 | 1 | R_5 | R_6 |
| 0 | R_6 | R_7 | 1 | R_6 | R_7 |
| 0 | R_7 | R_8 | 1 | R_7 | R_8 |
| 0 | R_8 | R_9 | 1 | R_8 | R_9 |
| 0 | R_9 | R_10 | 1 | R_9 | R_10 |
| 0 | R_10 | R_11 | 1 | R_10 | R_11 |
| 0 | R_11 | NOT USED | 1 | R_11 | NOT USED |
| 1 | G_2 | G_3 | 1 | R_0 | R_0 |
| 1 | G_3 | G_4 | 1 | R_1 | R_1 |
| 1 | G_4 | G_5 | 1 | G_0 | R_2 |
| 1 | G_5 | G_6 | 1 | G_1 | G_0 |
| 1 | G_6 | G_7 | 1 | B_0 | G_1 |
| 1 | G_7 | G_8 | 1 | B_1 | G_2 |
| 1 | G_8 | G_9 | 1 | NOT USED | B_0 |
| 1 | G_9 | G_10 | 1 | NOT USED | B_1 |
| 1 | G_10 | G_11 | 1 | NOT USED | B_2 |
| 1 | G_11 | NOT USED | 1 | NOT USED | NOT USED |
| 2 | B_2 | B_3 | 3 | B_2 | B_3 |
| 2 | B_3 | B_4 | 3 | B_3 | B_4 |
| 2 | B_4 | B_5 | 3 | B_4 | B_5 |
| 2 | B_5 | B_6 | 3 | B_5 | B_6 |
| 2 | B_6 | B_7 | 3 | B_6 | B_7 |
| 2 | B_7 | B_8 | 3 | B_7 | B_8 |
| 2 | B_8 | B_9 | 3 | B_8 | B_9 |
| 2 | B_9 | B_10 | 3 | B_9 | B_10 |
| 2 | B_10 | B_11 | 3 | B_10 | B_11 |
| 2 | B_11 | NOT USED | 3 | B_11 | NOT USED |
| 2 | G_2 | G_3 | 2 | R_0 | R_0 |
| 2 | G_3 | G_4 | 2 | R_1 | R_1 |
| 2 | G_4 | G_5 | 2 | G_0 | R_2 |
| 2 | G_5 | G_6 | 2 | G_1 | G_0 |
| 2 | G_6 | G_7 | 2 | B_0 | G_1 |
| 2 | G_7 | G_8 | 2 | B_1 | G_2 |
| 2 | G_8 | G_9 | 2 | NOT USED | B_0 |
| 2 | G_9 | G_10 | 2 | NOT USED | B_1 |
| 2 | G_10 | G_11 | 2 | NOT USED | B_2 |
| 2 | G_11 | NOT USED | 2 | NOT USED | NOT USED |
| 2 | R_2 | R_3 | 3 | R_2 | R_3 |
| 2 | R_3 | R_4 | 3 | R_3 | R_4 |
| 2 | R_4 | R_5 | 3 | R_4 | R_5 |
| 2 | R_5 | R_6 | 3 | R_5 | R_6 |
| 2 | R_6 | R_7 | 3 | R_6 | R_7 |
| 2 | R_7 | R_8 | 3 | R_7 | R_8 |
| 2 | R_8 | R_9 | 3 | R_8 | R_9 |
| 2 | R_9 | R_10 | 3 | R_9 | R_10 |
| 2 | R_10 | R_11 | 3 | R_10 | R_11 |
| 2 | R_11 | NOT USED | 3 | R_11 | NOT USED |
| 3 | G_2 | G_3 | 3 | R_0 | R_0 |
| 3 | G_3 | G_4 | 3 | R_1 | R_1 |
| 3 | G_4 | G_5 | 3 | G_0 | R_2 |
| 3 | G_5 | G_6 | 3 | G_1 | G_0 |
| 3 | G_6 | G_7 | 3 | B_0 | G_1 |
| 3 | G_7 | G_8 | 3 | B_1 | G_2 |
| 3 | G_8 | G_9 | 3 | NOT USED | B_0 |
| 3 | G_9 | G_10 | 3 | NOT USED | B_1 |
| 3 | G_10 | G_11 | 3 | NOT USED | B_2 |
| 3 | G_11 | NOT USED | 3 | NOT USED | NOT USED |
| 4 | B_2 | B_3 | 5 | B_2 | B_3 |
| 4 | B_3 | B_4 | 5 | B_3 | B_4 |

TABLE 8-continued

| | Link A | | | Link B | |
|---|---|---|---|---|---|
| Pixel # | SMPTE 372 Encoding | New Encoding | Pixel # | SMPTE 372 Encoding | New Encoding |
| 4 | B_4 | B_5 | 5 | B_4 | B_5 |
| 4 | B_5 | B_6 | 5 | B_5 | B_6 |
| 4 | B_6 | B_7 | 5 | B_6 | B_7 |
| 4 | B_7 | B_8 | 5 | B_7 | B_8 |
| 4 | B_8 | B_9 | 5 | B_8 | B_9 |
| 4 | B_9 | B_10 | 5 | B_9 | B_10 |
| 4 | B_10 | B_11 | 5 | B_10 | B_11 |
| 4 | B_11 | NOT USED | 5 | B_11 | NOT USED |
| 4 | G_2 | G_3 | 4 | R_0 | R_0 |
| 4 | G_3 | G_4 | 4 | R_1 | R_1 |
| 4 | G_4 | G_5 | 4 | G_0 | R_2 |
| 4 | G_5 | G_6 | 4 | G_1 | G_0 |
| 4 | G_6 | G_7 | 4 | B_0 | G_1 |
| 4 | G_7 | G_8 | 4 | B_1 | G_2 |
| 4 | G_8 | G_9 | 4 | NOT USED | B_0 |
| 4 | G_9 | G_10 | 4 | NOT USED | B_1 |
| 4 | G_10 | G_11 | 4 | NOT USED | B_2 |
| 4 | G_11 | NOT USED | 4 | NOT USED | NOT USED |
| 4 | R_2 | R_3 | 5 | R_2 | R_3 |
| 4 | R_3 | R_4 | 5 | R_3 | R_4 |
| 4 | R_4 | R_5 | 5 | R_4 | R_5 |
| 4 | R_5 | R_6 | 5 | R_5 | R_6 |
| 4 | R_6 | R_7 | 5 | R_6 | R_7 |
| 4 | R_7 | R_8 | 5 | R_7 | R_8 |
| 4 | R_8 | R_9 | 5 | R_8 | R_9 |
| 4 | R_9 | R_10 | 5 | R_9 | R_10 |
| 4 | R_10 | R_11 | 5 | R_10 | R_11 |
| 4 | R_11 | NOT USED | 5 | R_11 | NOT USED |
| 5 | G_2 | G_3 | 5 | R_0 | R_0 |
| 5 | G_3 | G_4 | 5 | R_1 | R_1 |
| 5 | G_4 | G_5 | 5 | G_0 | R_2 |
| 5 | G_5 | G_6 | 5 | G_1 | G_0 |
| 5 | G_6 | G_7 | 5 | B_0 | G_1 |
| 5 | G_7 | G_8 | 5 | B_1 | G_2 |
| 5 | G_8 | G_9 | 5 | NOT USED | B_0 |
| 5 | G_9 | G_10 | 5 | NOT USED | B_1 |
| 5 | G_10 | G_11 | 5 | NOT USED | B_2 |
| 5 | G_11 | NOT USED | 5 | NOT USED | NOT USED |

Although described in terms of sending 12-bit, 4:4:4, RGB data over four, 10-bit subchannels, the above-described encoding scheme may be extended to other types of video. Generally, given a link (or links) with x subchannels, each subchannel having n bits, data may be mapped into the x subchannels such that x(n−1) bits may be transmitted over the link. In particular embodiments, data may be mapped into the (n−1) least significant bits of the subchannels. The most significant bit of each subchannel is then set to be the compliment of the next most significant bit. A flowchart of this generalized example is illustrated in FIG. 5.

As shown in FIG. 5, flowchart 500 illustrates a method of mapping data into a plurality of n-bit subchannels in accordance with a particular embodiment of the present invention. After flowchart 500 begins in block 501, the data to be transmitted is divided equally among the subchannels in block 502. Data is then mapped into the (n−1) least significant bits of the first subchannel in block 503. At block 504, the most bit of the subchannel is set to be compliment of the next most significant bit. At block 505, a determination is made whether more subchannels remain to be mapped. If more subchannels remain, the process moves to the next subchannel, at block 506, before returning to block 503 to beginning mapping data into the subchannel. However, if no additional subchannels remain to be mapped, the process simply terminates at block 507.

By taking advantage of many of the encryption and encoding schemes described above, particular embodiments of the present invention are able to transport locally-encrypted video data across different link types (e.g., HD-SDI, DVI, Ethernet) while maintaining bit stream compatibility. This link-independence may offer numerous benefits, in some embodiments including the ability to consecutively route the locally-encrypted data through two different link types without the need to decrypt and re-encrypt the data based on the link type. In particular embodiments of the present invention, this bit stream compatibility is enabled, in part, by driving the AES random number generators with parameters that are independent of the physical link type. For example, particular embodiments of the present invention may use the active line count as an input to the AES random number generator, as described above with regard to Table 7. Unlike parameters such as the video line number, the active line count, does not vary for different link types.

Bit stream compatibility also requires that the relationship between the 10-bit word generated by the AES random number generator and the 10-bit plaintext words to be encrypted be driven by parameters that are not specific to the physical link type. For example, bit stream compatibility would not be possible with an AES-to-plaintext mapping scheme that requires knowledge of the size of the horizontal blanking time, since horizontal blanking time varies for different physical link types. Therefore, particular embodiments of the present invention instead use a deterministic mapping between AES words and plaintext words, as also described above.

Bit stream compatibility also requires that the bit-to-bit mapping between the AES random numbers and the plaintext to be encrypted be defined in such way so as to prevent prohibited codes from being created by the encryption modulators. For example, as mentioned earlier, the SMPTE 372 standard has eight prohibited codes. Therefore, particular embodiments of the present invention define the bit-to-bit mapping between the AES random numbers and the plaintext in such a way that prohibited codes are prevented from generated in the local link encryption scheme, such as in the new 12-bit, 4:4:4, RGB encoding scheme described above in Table 8.

Thus, by driving the AES random generators with non-link-specific parameters, defining the bit-to-bit mapping between the AES random numbers and the plaintext in such a way as to prevent prohibited codes, and using a simple deterministic mapping between AES words and plaintext words, particular embodiments of the present invention are capable of providing a self-consistent encryption method. Such a method enables bit stream compatibility in which video data of the same type is encrypted in a common way such that the same encrypted data can be transported across many different link types (e.g., dual-link HD-SDI, dual-link DVI, and Ethernet) without the need to decrypt and re-encrypt the data.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method of transporting 12-bit, 4:4:4, RGB video data through a dual-link HD-SDI connection, comprising:
    providing a playback server with a dual-link HD-SDI connection, the dual-link HD-SDI connection having four 10-bit subchannels;
    dividing 12-bit, 4:4:4, RGB video data into four 9-bit sections;

mapping each 9-bit section of video data into nine least significant bits of a respective one of the four 10-bit subchannels;
setting a most significant bit of each 10-bit subchannel to be a compliment of a next most significant bit of the 10-bit subchannel; and
outputting the sections of video data from the playback server through the dual-link HD-SDI connection.

2. The method of claim 1, further comprising encrypting the sections of video data using a local link encryption system prior to outputting the sections of video data from the playback server through the dual-link HD-SDI connection.

3. The method of claim 1, further comprising decrypting the sections of video data using a local link decryption system after outputting the sections of video data from the playback server through the dual-link HD-SDI connection.

4. A method of transporting data through a multi-link HD-SDI connection, comprising:
dividing data into sections of approximately equivalent numbers of bits, each section having nine or less bits;
mapping each section of data into of a respective 10-bit subchannel of a multi-link HD-SDI connection;
setting one unused bit of each 10-bit subchannel of the multi-link HD-SDI connection to be a compliment of one other bit of the 10-bit subchannel; and
outputting the sections of data through the multi-link HD-SDI connection of a server.

5. The method of claim 4, wherein the one unused bit is a most significant bit and the one other bit is a next most significant bit.

6. The method of claim 4, wherein the one unused bit and the one other bit are selected from the eight most significant bits of the 10-bit subchannel.

7. The method of claim 4, wherein the multi-link HD-SDI connection comprises a dual-link HD-SDI connection having four 10-bit subchannels.

8. The method of claim 4, wherein the data comprises 12-bit, 4:4:4, RGB video data.

9. The method of claim 4, further comprising encrypting the data using a local link encryption system prior to outputting the sections of data through the multi-link HD-SDI connection.

10. The method of claim 9, further comprising decrypting the data using a local link decryption system after outputting the sections of data through the multi-link HD-SDI connection.

11. The method of claim 4, further comprising coupling a digital video projector and a playback server with the multi-link HD-SDI connection; and
wherein transporting the sections of data through the multi-link HD-SDI connection comprises transporting the sections of data from the playback server to the digital video projector through the multi-link HD-SDI.

12. A system for transporting video data, comprising a server operable to:
divide 12-bit, 4:4:4, RGB video data into four 9-bit sections of video data;
map each 9-bit section of video data into nine least significant bits of a respective 10-bit subchannel of a dual-link HD-SDI connection;
set a most significant bit of each 10-bit subchannel of the dual-link HD-SDI connection to be a compliment of a next most significant bit of the 10-bit subchannel; and
output the sections of video data through the dual-link HD-SDI connection of the server.

13. The system of claim 12, wherein the server is further operable to encrypt the video data using an local link encryption system prior to outputting the sections of video data through the dual-link HD-SDI connection.

14. The system of claim 12, wherein the server comprises an local link encryption module operable to encrypt the video data prior to outputting the sections of video data through the dual-link HD-SDI connection.

15. The system of claim 14, wherein the local link encryption module comprises at least one AES-based local link encryption engine.

16. The system of claim 12, further comprising a digital video projector operable to receive the sections of video data through the dual-link HD-SDI connection.

17. The system of claim 16, wherein the digital video projector is operable to receive the sections of video data from the playback server through the dual-link HD-SDI connection.

18. The system of claim 16, wherein the digital video projector is further operable to decrypt the video data using an local link decryption system after receiving the sections of video data from the playback server through the dual-link HD-SDI connection.

19. The system of claim 16, wherein the digital video projector comprises an local link decryption module operable to decrypt the video data after receiving the sections of video data from the playback server through the dual-link HD-SDI connection.

20. The system of claim 19, wherein the local link decryption module comprises at least one AES-based local link decryption engine.

* * * * *